June 21, 1949. R. I. CUMMING 2,473,638
HYDRAULIC TRANSMISSION AND CLUTCH
Filed Sept. 14, 1944 2 Sheets-Sheet 1
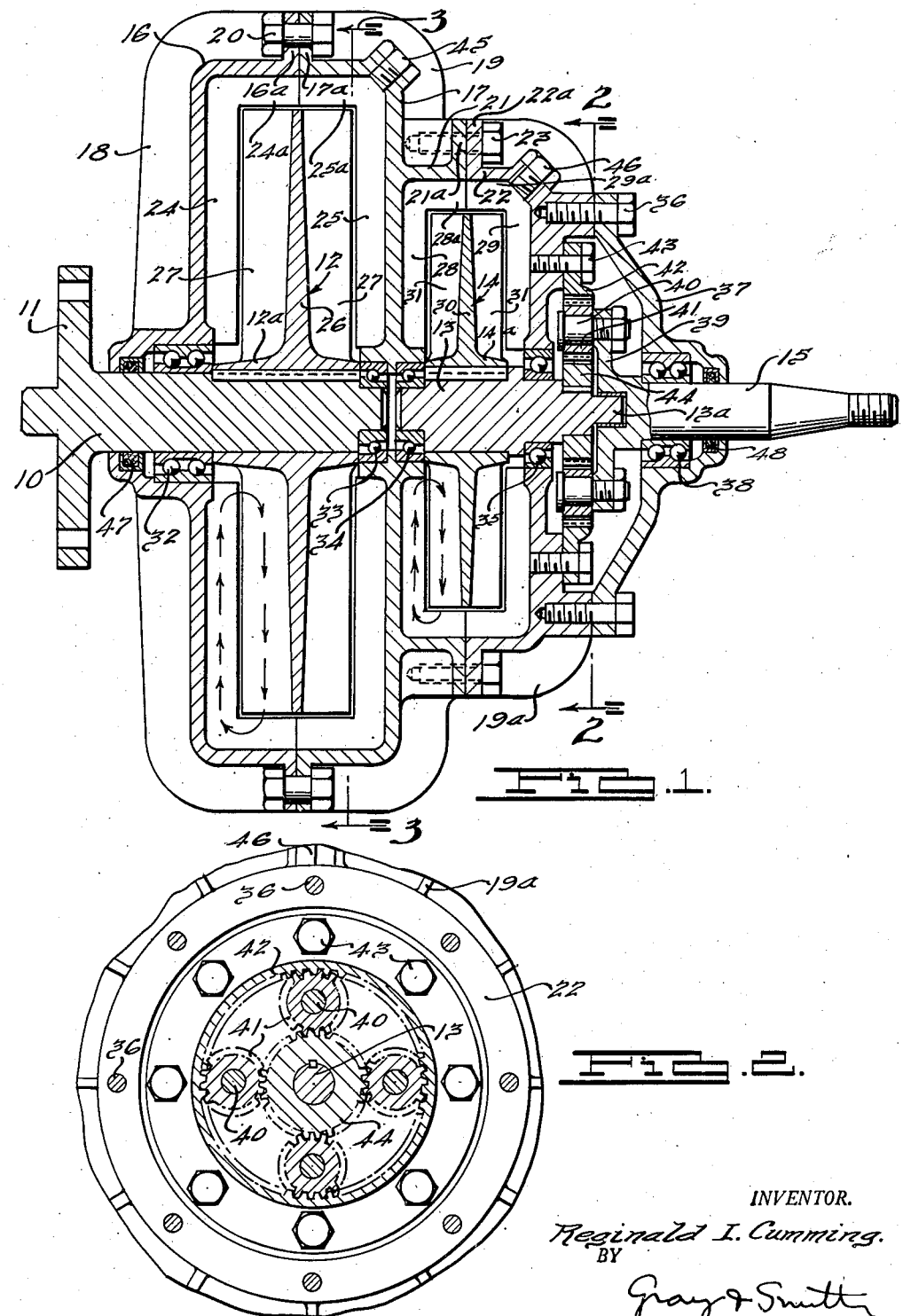
INVENTOR.
Reginald I. Cumming.
BY
Gray & Smith
ATTORNEYS.

June 21, 1949.  R. I. CUMMING  2,473,638
HYDRAULIC TRANSMISSION AND CLUTCH
Filed Sept. 14, 1944  2 Sheets-Sheet 2

INVENTOR.
Reginald I. Cumming.
BY
Gray & Smith
ATTORNEYS.

Patented June 21, 1949

2,473,638

UNITED STATES PATENT OFFICE 2,473,638

HYDRAULIC TRANSMISSION AND CLUTCH

Reginald I. Cumming, Ypsilanti, Mich., assignor of twenty-five per cent to Edwin G. Streicher, twenty-five per cent to Edward M. Streicher, and twenty-five per cent to George A. Weins, all of Ypsilanti, Mich.

Application September 14, 1944, Serial No. 554,008

6 Claims. (Cl. 74—688)

This invention relates to variable speed transmissions and more particularly to a hydraulic clutch and forward speed transmission mechanism by means of which varying speed ratios may be obtained between a driving element or input shaft and a driven element or output shaft.

An object of the invention is to provide an improved hydraulic transmission unit which is relatively simple and compact in construction, efficient and durable in operation and which is adaptable for a variety of uses where it is desired to transmit at varying speeds to a driven shaft or element the torque of a driving element or input shaft.

A further object of the invention is to provide an improved hydraulic clutch or transmission unit by which varying speed ratios are obtained through the medium of relatively rotatable impeller and housing elements coaxially arranged and provided respectively with radially extending blades or fins cooperable during relative rotation of the elements to transmit rotative effort from one to the other in improved and efficient manner.

Another object of the invention is to provide a hydraulic transmission and clutch in which the torque of the input shaft is transmitted by a hydraulic impeller unit through a set of planetary gearing to the output shaft and in which the speed ratio of the latter is varied through the medium of a second hydraulic impeller unit adapted to control the speed characteristics of the sun gear of the planetary gear set.

Still a further object of the invention is to provide an improved hydraulic transmission having relatively rotatable housing and impeller elements, one secured to the input or driving shaft and the other carrying the internal gear of a planetary gear set, the planet pinions of the set being carried by the output shaft and normally adapted to transmit a predetermined maximum speed thereto less than that of the input shaft, and in which the speed of the output shaft may be varied by controlling the sun gear of the planetary gear set through the medium of a second impeller element associated and cooperating with a housing which is common to both impeller elements of the transmission.

Another object of the invention is to provide a hydraulic or fluid clutch embodying relatively rotatable housing and impeller elements drivingly connected one to an input shaft and the other to an output shaft or the like and in which the transmission of power from one element to the other is accomplished by means of radially extending blades or fins on the impeller movable within an annular space formed by radially extending blades or fins extending inwardly from the inner walls of the housing, the improved construction being such that during relative rotation of the housing and impeller elements the planes of successive blades or fins of one element have instantaneous coincidence with the planes of successive blades or fins of the other element.

A further object of the invention is to provide a hydraulic clutch or transmission unit having a rotatable impeller mounted within a rotatable housing and coaxial therewith, the impeller having radially extending blades or vanes movable between similarly arranged internal vanes or fins on the housing, the transmission of power being accomplished by differential pressures created between adjacent faces of the respective blades as each blade of the impeller passes through and beyond a position in which it is instantaneously coplanar with an adjacent blade or fin of the housing, the improved operation also being such that a circulation of the hydraulic medium in a radial direction is induced between each adjacent pair of blades or fins thus permitting effective dissipation of heat and efficient control of the temperature of the hydraulic medium.

Other objects of this invention will appear in the following description and appended claims, reference being had to the accompanying drawings forming a part of this specification wherein like reference characters designate corresponding parts in the several views.

Fig. 1 is a central longitudinal sectional view of a hydraulic clutch or transmission constructed in accordance with the invention.

Fig. 2 is a section taken substantially through lines 2—2 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 3:
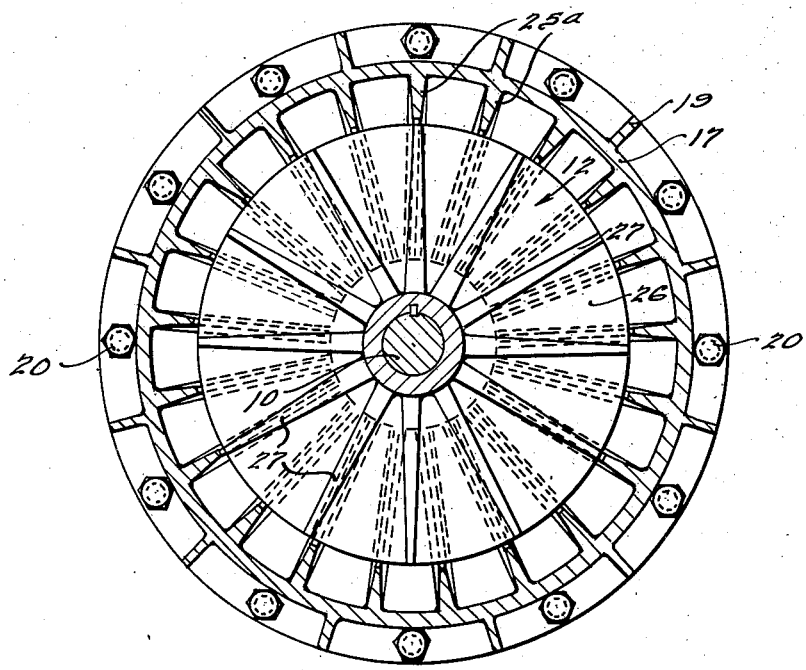
Fig. 3 is a section taken substantially through lines 3—3 of Fig. 1 looking in the direction of the arrows.

Referring to Figs. 1 to 3 inclusive, wherein one embodiment of the invention is illustrated by way of example, the input or drive shaft is shown at 10 having a driving flange 11 by which it may be drivingly connected to a prime mover or other driving element, such as a crank shaft or propeller shaft. In the present transmission unit the driving impeller, generally designated at 12, is provided with a hub 12a splined or keyed to the shaft 10. Arranged in line with the shaft 10 is an intermediate shaft 13, herein termed the variable speed shaft, and keyed or splined to this shaft is the hub 14a of a variable speed impeller 14. The shaft 13 has a projecting pilot portion 13a extending into an annular recess in the inner end of an output or driven shaft 15 arranged coaxially with the shafts 10 and 13.

The driving and variable speed impellers are mounted within a unitary housing formed of a plurality of annular sections. The cylindrical housing for the impeller 12 comprises two sections 16 and 17 provided with radially extending external cooling fins 18 and 19. These sections have annularly extending flanges 16a and 17a arranged face to face in abutting relation and bolted together at 20 to provide a liquid tight joint. It will be understood that a gasket is interposed in practice between these attaching flanges in order to ensure against leakage of the oil or other hydraulic medium within the housing. Projecting from the housing section 17 is an integral housing section 21 of smaller diameter having an annular attaching flange 21a arranged face to face with a corresponding attaching flange 22a on a housing section 22. These flanges are bolted together at 23 with a gasket interposed therebetween to provide a seal. As in the case of the housing sections 16 and 17, the housing sections 21 and 22 provide an annular cylindrical chamber within which is housed the variable speed impeller 14.

Projecting inwardly from the side walls respectively of the housing sections 16 and 17 are radially extending fins, blades or baffles 24 and 25. Each blade 24 and 25 at its outer end has an integral right angularly extending extension 24a and 25a respectively which projects from the outer wall of the housing section radially inwardly. Each pair of fins 24 and 25 lies in a single plane and the fin extensions 24a and 25a of each pair meet at their ends and are coplanar. Thus, in effect, there is provided within the housing 16, 17 for the driving impeller a series of radially extending circumferentially spaced U-shaped fin members each comprising coplanar portions 24, 24a, 25a and 25 extending substantially continuously around three sides of the interior of the housing and forming a central opening or passage through which the impeller is adapted to rotate. Each adjacent pair of fin members, thus formed, defines a channel of uniform depth which is generally V-shaped having radial side walls which diverge outwardly and terminate at the outer annular wall of the housing.

The impeller 12 comprises a disk or web 26 having a series of fins or blades 27 extending from opposite sides thereof. These blades or vanes project radially from the hub 12a and, hence, diverge outwardly. The blades 27 of each pair are coplanar and occupy an area slightly less than the area of the opening or space between the fins 24—25, thus permitting the marginal edges of the impeller blades to just clear the marginal edges of the housing fins during relative rotation of the housing and impeller.

The housing for the variable speed impeller, formed by sections 21 and 22, is constructed with a finned passage for the impeller similarly to the housing for the driving impeller. Projecting inwardly from the inner side walls respectively of the variable speed impeller housing are radially extending fins, blades or baffles 28 and 29, each of which at its outer end having an integral right angularly extending extension 28a and 29a respectively projecting from the outer wall of the housing. The fins 28 and 29 with their extensions 28a and 29a are arranged in coplanar pairs in the same manner as the fins 24 and 25 with their outer angular extensions 24a and 25a.

The impeller 14 comprises a disk or web 30 having a series of fins or blades 31 extending from opposite sides thereof and projecting radially from the hub 14a of the impeller. These blades are arranged in pairs with the blades of each pair coplanar, similarly to the blade construction of the impeller 12. Thus, the variable speed impeller 14 with its outwardly diverging radial blades 31 is rotatable within an annular passage formed between the fins 28, 29 of the housing and occupies an area slightly less than the area of the space between the finned portions of the housing so as to just clear the edges thereof during relative rotation of the housing and impeller.

The housing section 16 has a main bearing 32 on the shaft 10 and bearings 33, 34 at adjacent reduced ends of the shafts 10 and 13. The housing section 22 is preferably provided with cooling fins 19a and is supported by a bearing 35 on the intermediate shaft 13. Bolted at 36 to the housing section 22 is an end housing section 37 which has a bearing at 38 on the output shaft 15. Integral with the inner end of the shaft 15 is an annular flange 39 within which are fastened a series of four stud shafts 40 carrying planet gears or pinions 41. These pinions mesh with a ring or internal gear 42 rigidly secured by bolts 43 to the housing section 22. The planet pinions also mesh with a reaction sun gear 44 keyed to the intermediate shaft 13.

It will be seen that the main housing composed of sections 16, 17, 22 and 37 is adapted to rotate as a unit relatively to the input shaft and is divided into three compartments within which are housed the driving impeller, the variable speed impeller and the planetary gear set comprising ring gear 42, planet gears 41 and sun gear 44. The housings for the impellers are conveniently provided with filler openings through which the hydraulic medium, such as oil, may be introduced therein to fill the housing, these openings being closed by plugs 45 and 46. The entire housing is made liquid-tight so as to contain the hydraulic medium therein against appreciable leakage during continued use. Accordingly, packing glands 47 and 48 are provided at opposite ends of the housing for this purpose.

In operation the shaft 10 is rotated to transmit rotative motion to the impeller 12 through its splined connection thereto. As the impeller rotates within the annular space or passage formed between the marginal edges of the housing fins 24, 25, pressure of the hydraulic medium is built up in advance of the leading faces of the blades 27 and a reduced or negative pressure at the rear faces thereof, thus exerting a drag or pull on the housing fins and imparting rotative motion to the housing in the direction of rotation of the impeller. This motion is transmitted to internal gear 42, which is fastened to the housing, and since this gear is in mesh with the planet pinions 41 carried by the driven shaft 15 the planet pinions will be rotated both about their own axes and also bodily around the sun gear 44 with which they are in mesh. This motion of the planet gears around the sun gear will be transmitted to the driven shaft. Assuming that the shaft 13 is stationary and the sun gear is not turning on its own axis, the driven shaft 15 will rotate at one half of the speed of the input shaft 10 when the housing has attained the same speed or rotation as the impeller 12. The interval of time required for the housing speed to attain that of the driving impeller will depend upon the torque effort and the load imposed upon the output or driven shaft 15. Since this load is divided equally between internal gear 42 and sun gear 44, which assumes the torque reaction, it will be seen that the variable speed impeller unit need be but one half the size of the driving impeller unit and correspondingly smaller in capacity. Thus, the blade of finned area of the impeller 14 and its housing is one half that of the impeller 12 and its housing.

The speed ratio of two to one between the shafts 10 and 15, which would be obtainable if the sun gear 44 remained stationary, is varied up to a one to one ratio through the medium of the variable speed propeller unit. Since the entire housing rotates as a unit by reason of the operation of the main impeller 12, the housing sections 21 and 22 will also initially rotate around the impeller 14. This action will create a pressure of the fluid in advance of the housing fins 28, 29 and a reduced pressure behind these fins, thereby producing a drag or pull upon the impeller blades 31 and a consequent rotation of the impeller 14. Rotative motion of this impeller is transmitted through shaft 13 to the sun gear 44. As the speed of rotation of the sun gear increases, the speed of rotation of the planet pinions about their own axes decreases proportionately, thus producing a proportionate increase in the speed of rotation of the driven shaft. When the impeller 14 and the sun gear are rotated at the same speed as the housing, assuming that the housing has attained the same speed as the driving impeller, then a one to one ratio is attained resulting in a direct drive from the shaft 10 to the shaft 15. Under these conditions the entire transmission unit will be immobilized, that is, the entire housing, the impellers and the gear train will turn as a unit without any relative motion between any of the gears or between the impellers and the housing.

From the foregoing it will be seen that by virtue of the present hydraulic transmission and clutch unit virtually any speed ratio may be obtained between the input and output shafts up to a direct drive ratio of one to one. The operation of the impellers in association with the finned housing is highly efficient not only in the transmission of power but also in respect to minimization of heat losses and consequent loss of power. Excessive heating of the fluid medium is also prevented by an induced circulation of the oil within the channels between the fins of the housing and the blades of the impellers. Relative rotation of the impeller and housing creates a low pressure zone at the outer end of the housing at the trailing sides of the impeller blades, thus inducing an outward flow of oil within the channels between the impeller blades. The oil moving in the channels toward the outer end of the housing is forced by the blades outwardly and thence laterally causing it to flow radially inwardly through the channels between the housing fins. A continuous circulatory flow of oil, as shown by the arrows in Fig. 1, is set up by the relative rotation of the housing and impellers thereby maintaining a relatively low temperature of the oil and enabling heat to be more effectively dissipated through the walls of the housing and the cooling fins 18, 19 and 19a. In addition to the foregoing features of the present transmission, a further feature by which improvement in operation is obtained resides in the flared construction of the channels between the blades or fins of the housing and impeller members. Furthermore, greater effectiveness in the transmission of torque is achieved by providing a considerably less number of blades on the impeller than fins on the housing so that the distance between the outer ends of adjacent impeller blades will be considerably greater than between adjacent fin portions.

Figure 4:
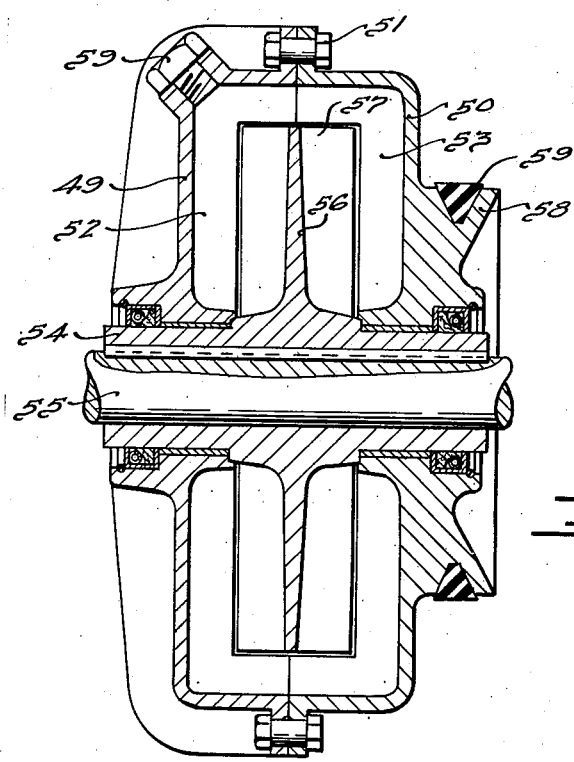
Fig. 4 is a central longitudinal sectional view illustrating another embodiment of the invention.

The embodiment illustrated in Fig. 4 is similar in many respects to the previous embodiment, differing therefrom principally in that the transmission or hydraulic clutch unit consists of a single impeller assembly for transmitting power directly from a drive element to a driven element without the interposition of a reaction impeller unit and a planetary gear set. A single fluid tight annular housing comprising two sections 49 and 50 having attaching flanges bolted together at 51 is provided in this embodiment. The housing sections are formed with radial internal fins 52 and 53 constructed and arranged in identically the same manner as the fins 24, 24a, 25 and 25a of the previous embodiment. The housing 49, 50 is journalled through suitable bushings on an impeller hub 54 which in turn is splined to the input shaft 55. The impeller hub is formed with an impeller 56 comprising a disk or web provided with radial vanes or blades 57. This impeller is constructed identically to the impeller 12 and functions in cooperation with the vanes or fins 52, 53 in the same manner as the driving impeller unit of the previous embodiment. Preferably formed integrally on the outer side of the housing section 50 is a pulley or sheave 58 grooved to receive a pulley belt 59 by which power may be transmitted to any desired driven member through a companion sheave or pulley on the latter. The operation of the device shown in Fig. 4 by which power is transmitted hydraulically from shaft 55 and impeller 56 to the housing 49, 50 through its fins or vanes 52, 53 and thence to the belt 59 will be readily understood from the description of the operation of the previous embodiment.

I claim:

1. In a hydraulic transmission, a rotatable housing unit comprising two adjacent annular chambers adapted to contain a hydraulic medium and each provided with a series of diverging radially extending fins, each fin comprising portions within the chamber extending inwardly in the same plane from the side and end walls of the chamber, a pair of impellers coaxial with the housing unit and disposed within said chambers, each impeller having a series of diverging radially extending fins movable within the annular space formed between the inner edges of the fins of the associated chamber, means for supporting said impellers for rotation one independently of the other, a driving element connected to one impeller, a driven element, and gearing connecting the driven element, housing unit and second impeller.

2. In a hydraulic transmission, a rotatable housing unit comprising two adjacent annular chambers adapted to contain a hydraulic medium and each provided with a series of diverging radially extending fins, each fin comprising portions within the chamber extending inwardly in the same plane from the side and end walls of the chamber, a pair of impellers coaxial with the housing unit and disposed within said chambers, each impeller having a series of diverging radially extending fins movable within the annular space formed between the inner edges of the fins of the associated chamber, means for supporting said impellers for rotation one independently of the other, means for driving one impeller, a driven element, and a planetary gear set for varying the speed of the driven element including an internal gear on the housing unit, planet gears carried by the driven element and a sun gear drivingly connected to the second impeller.

3. In a hydraulic transmission, a rotatable housing unit comprising two adjacent annular chambers, an impeller within each chamber, said impellers and housing unit being arranged co-axially, radially extending fins extending inwardly from the inner walls of the chambers and cooperable with radially extending fins on the impellers, means for driving one impeller, a driven element, planet gears carried by the driven element, an internal gear on the housing meshing with said planet gears, and a sun gear meshing with the planet gears and connected to the second impeller.

4. In a hydraulic transmission, a rotatable housing unit comprising two adjacent annular chambers, an impeller within each chamber, said impellers and housing unit being arranged co-axially, radially extending fins extending inwardly from the inner walls of the chambers and cooperable with radially extending fins on the impellers, means for driving one impeller, a driven element, planet gears carried by the driven element, an internal gear on the housing meshing with said planet gears, and a sun gear meshing with the planet gears and connected to the second impeller, said second impeller and associated chamber having less fin area than the first named impeller and its associated chamber.

5. In a hydraulic transmission, a rotatable housing unit comprising two adjacent annular chambers, an impeller within each chamber, said impellers and housing unit being arranged co-axially, radially extending fins extending inwardly from the inner walls of the chambers and cooperable with radially extending fins on the impellers, means for driving one impeller, a driven element, and a variable speed gear set connecting the driven element, housing unit and second impeller, said gear set including a member rotatable with said second impeller.

6. In a hydraulic transmission, a rotatable housing unit comprising two adjacent annular chambers adapted to contain a hydraulic medium and each provided with a series of diverging radially extending fins, each fin comprising portions within the chamber extending inwardly in the same plane from the side and end walls of the chamber, a pair of impellers coaxial with the housing unit and disposed within said chambers, each impeller having a series of diverging radially extending fins movable within the annular space formed between the inner edges of the fins of the associated chamber, means for supporting said impellers for rotation one independently of the other, a driving element connected to one impeller, a driven element, and variable speed gearing interposed between the driven element, housing unit and second impeller, said gearing including a sun gear rotatable with said second impeller.

REGINALD I. CUMMING.

REFERENCES CITED

The following references are of record in the file of this patent:

UNITED STATES PATENTS

| Number | Name | Date |
| --- | --- | --- |
| 1,203,265 | Radcliffe | Oct. 31, 1916 |
| 1,242,974 | Pinckney | Oct. 16, 1917 |
| 1,540,453 | Arave | June 2, 1925 |
| 1,636,050 | Fottinger | July 19, 1927 |
| 1,918,163 | Wohlenhaus | July 11, 1933 |
| 1,927,616 | Rudquist | Sept. 19, 1933 |
| 2,129,884 | Swan | Sept. 13, 1938 |
| 2,131,619 | Duffield | Sept. 27, 1938 |
| 2,212,774 | Guyer | Aug. 27, 1940 |
| 2,292,482 | Roche | Aug. 11, 1942 |
| 2,315,130 | Peterson | Mar. 30, 1943 |
| 2,368,873 | Pollard | Feb. 6, 1945 |
| 2,388,062 | Keller | Oct. 30, 1945 |

FOREIGN PATENTS

| Number | Country | Date |
| --- | --- | --- |
| 372,983 | Great Britain | May 19, 1932 |
| 407,146 | Great Britain | Mar. 15, 1934 |
| 546,009 | France | Oct. 26, 1922 |